United States Patent
Song et al.

(10) Patent No.: US 8,628,196 B2
(45) Date of Patent: Jan. 14, 2014

(54) DISPLAY DEVICE AND DISPLAY METHOD

(75) Inventors: Xuefeng Song, Beijing (CN); Jiangliang Li, Beijing (CN)

(73) Assignee: Ocean of Peace Scientific Beijing Ltd., Beijing (CN)

(*) Notice: Subject to any disclaimer, the term of this patent is extended or adjusted under 35 U.S.C. 154(b) by 517 days.

(21) Appl. No.: 12/738,261

(22) PCT Filed: Oct. 14, 2008

(86) PCT No.: PCT/CN2008/001733
§ 371 (c)(1),
(2), (4) Date: Nov. 15, 2010

(87) PCT Pub. No.: WO2009/052698
PCT Pub. Date: Apr. 30, 2009

(65) Prior Publication Data
US 2011/0051091 A1    Mar. 3, 2011

(30) Foreign Application Priority Data
Oct. 16, 2007   (CN) .......................... 2007 1 0175937

(51) Int. Cl.
| | | |
|---|---|---|
| G03B 21/00 | (2006.01) | |
| G03B 21/56 | (2006.01) | |
| G02B 27/22 | (2006.01) | |
| H04N 13/00 | (2006.01) | |
| H04N 13/04 | (2006.01) | |
| H04N 15/00 | (2006.01) | |

(52) U.S. Cl.
USPC ............... 353/7; 359/449; 359/462; 359/475; 348/42; 348/44; 348/51

(58) Field of Classification Search
USPC ............ 353/7–8, 10; 359/462, 466–468, 471, 359/475, 477, 449, 458; 348/42, 44, 51–54
See application file for complete search history.

(56) References Cited

U.S. PATENT DOCUMENTS

| | | | | |
|---|---|---|---|---|
| 3,248,165 | A * | 4/1966 | Marks et al. ..................... 352/58 |
| 5,926,294 | A | 7/1999 | Sato et al. | |
| 6,201,565 | B1 * | 3/2001 | Balogh ........................... 348/40 |
| 6,717,728 | B2 * | 4/2004 | Putilin ........................... 359/462 |
| 6,985,290 | B2 * | 1/2006 | Putilin et al. .................. 359/462 |

(Continued)

FOREIGN PATENT DOCUMENTS

| | | |
|---|---|---|
| CN | 1183848 A | 6/1998 |
| CN | 2485671 Y | 4/2002 |

(Continued)

OTHER PUBLICATIONS

Fu et al., [Research Progress of electronic ink technologies.] Journal of Functional Materials. 2005;36(10):1477-1481.

(Continued)

*Primary Examiner* — Tony Ko
*Assistant Examiner* — Jori S Reilly-Diakun
(74) *Attorney, Agent, or Firm* — Nutter McClennen & Fish LLP; David J. Powsner

(57) ABSTRACT

A display device and its display method are provided. The display method includes: first, inputting image message, then generating laser beams for forming an image according to the input image message to display an image. The image message includes angular message of each image pixels.

17 Claims, 9 Drawing Sheets

(56) References Cited

U.S. PATENT DOCUMENTS

| | | | |
|---|---|---|---|
| 7,573,491 B2* | 8/2009 | Hartkop et al. | 345/672 |
| 8,085,467 B1* | 12/2011 | Silverstein et al. | 359/443 |
| 8,218,235 B2* | 7/2012 | Silverstein et al. | 359/443 |
| 2012/0300176 A1* | 11/2012 | Roberts et al. | 353/10 |

FOREIGN PATENT DOCUMENTS

| | | |
|---|---|---|
| DE | 10 123 933 C1 | 11/2002 |
| FR | 2780517 A1 | 12/1999 |
| JP | 04-194907 A | 7/1992 |
| WO | 2004/013676 A2 | 2/2004 |
| WO | 2006/078177 A1 | 7/2006 |

OTHER PUBLICATIONS

International Search Report mailed Jan. 9, 2009 for Application No. PCT/CN2008/001733 (8 Pages).

Chinese Office Action issued Feb. 8, 2012 for Application No. 200710175937.2 (5 Pages).

\* cited by examiner

DISPLAY DEVICE AND DISPLAY METHOD

RELATED APPLICATIONS

This application is a National Stage of International Application No. PCT/CN2008/001733, filed Oct. 14, 2008, entitled "DISPLAY DEVICE AND ITS DISPLAY METHODS," which claims the benefit of priority Chinese Patent Application No. CN200710175937.2, filed on Oct. 16, 2007.

FIELD OF THE INVENTION

The present invention relates to a display device and its display method, and more specifically to a display device capable of projecting images into human eyes in a short distance and a display method thereof.

BACKGROUND OF THE INVENTION

With the development of display techniques, the world is demanding more and more on the vision effect as well as the portability of display devices. On one hand, wider view angle and three-dimensional display effect are needed; on the other hand, people want to make the display device itself as small as possible for easy use. To satisfy these two demands, which normally conflict, at present, various available display technologies have been developed. The display techniques of concern are generally divided two categories, i.e. head-mounted and non-head-mounted, and their disadvantages are listed below:

| category | display technology | disadvantages |
| --- | --- | --- |
| non-head-mounted | parallax barrier | Viewers are confined on specific view angles; Short range eye focusing conflicts with the convergence angle, which causes visual fatigue. Small view angle, poor telepresence vision. Large screen, poor portability. |
| | holography | The image reproducing condition is hard to meet and not widely applicable. Due to the lack of proper recording medium, dynamic display of images is still difficult. Despite of the vivid image, the narrow view angle limits the telepresency. Complex devices, poor portability. |
| head-mounted | shutter glasses/ complementary color glasses/ Polaroid glasses Helmet mounted display (HMD) method | Large screen, poor portability. Short range eye focusing conflicts with the convergence angle, which causes visual fatigue. Small view angle, poor telepresence vision. Big, heavy and energy consuming devices, poor portability. View angle limited by the optical lens aperture, poor telepresence vision. Short range eye focusing conflicts with the convergence angle, which causes visual fatigue. |

In brief, the aforementioned various display devices and display methods all suffer from narrow view angles, lack of telepresence vision and poor portability. Moreover, most of the display technologies listed above, except for holography, will cause visual fatigue.

The common feature of the existing display technologies is that a real or virtual image is established somewhere in the space, then the human eyes actively focus and look at that real or virtual image in the specific position, thereby forming the vision.

SUMMARY OF THE INVENTION

An objective of the present invention is to overcome the shortcomings of the existing display technologies by providing a display device, in which no active focusing of human eyes is needed.

Another objective of the present invention is to provide a display method for the above display device.

The present invention provides a display device comprising a display panel, wherein the display panel comprises an array of laser units which emit laser beams of specific angles, based on an image to be displayed, into human eyes to form an image on the retina.

In the above display device, a diameter of the laser beam cross section is less than 500 micrometers, preferably 1-100 micrometers.

In the above display device, each pixel of the display panel comprises a plurality of laser units.

In the above display device, the display device comprises two display panels for displaying the same image or different parallactic images to the left and right eyes respectively.

Furthermore, each pixel comprises three laser units having three primary colors Red, Green and Blue, respectively.

In the above display device, an area not having the laser units on the display panel is transparent to light from outside.

The shape of the display panel is preferably a spherical surface, a cylindrical surface, a planar surface, or other shapes such as an ellipsoidal surface, a paraboloid surface or a hyperboloid surface.

Furthermore, a radius of the spherical panel is 15-70 millimeters, a radius of the cylindrical panel is 15-70 millimeters, a distance between the planar panel and the eyeball center is 15-70 millimeters.

Furthermore, an angle of the spherical panel to the eyeball center is less than 180 degrees, both horizontally and vertically.

Furthermore, a horizontal angle of the cylindrical panel to the eyeball center is less than 180 degrees and a vertical size of the cylindrical panel is less than 200 millimeters.

Furthermore, a size of the planar panel is less than 200 millimeters, both horizontally and vertically.

The present invention further provides a display method for the display device described above, which comprises the steps of: inputting image data, wherein angles of pixels of the image are included; displaying, by each laser unit on the display panel, a pixel of the same angle as the laser unit; and outputting laser beams according to brightness of the related pixels and forming an image to human eyes.

The invention provides another display device comprising a display panel, wherein the display panel comprises an inner screen and an outer screen, both the inner screen and the outer screen locate in front of human eyes, and the inner screen lies closer to the human eyes;

an array of transparent holes is provided in the inner screen;

an array of luminous spots is provided in the outer screen;

the array of luminous spots emit light according to an image to be displayed;

the transparent holes in the inner screen have a mapping relation with the luminous spots in the outer screen, the light emitted by the luminous spots becomes light beams heading to the eyeball after traveling through the corresponding transparent holes in the inner screen.

The transparent holes in the inner screen are opened and blocked according to the image to be displayed.

The luminous spots emit light in a passive way.

The mapping relation between the luminous spots in the outer screen and the transparent holes in the inner screen is a one-to-one mapping.

In the above display device, a diameter of the transparent holes is 1-500 micrometers.

In the above display device, a transparent medium is provided between the inner screen and outer screen, a refractive index of the transparent medium is preferably 1-2.5.

Furthermore, a material of the medium is preferably selected from the group consisting of air, transparent resin and optical glass.

In the above display device, a diameter of the luminous spots in the outer screen is preferably 1-500 micrometers, a diameter of the transparent holes in the inner screen is preferably 1-500 micrometers.

In the above display device, a distance between the inner screen and eyeball surface is 0.1-50 millimeters, a distance between the outer screen and the inner screen is 0.1-50 millimeters.

In the above display device, an area not having the luminous spots in the outer screen is transparent to outside light.

Furthermore, the outer screens is preferably selected from the group consisting of LED (light-emitting diode) screens, LD (laser diode) screens, LCD (liquid crystal display) screens and OLED (organic light-emitting diode) screens; the outer screen may also be a device suitable for displaying images such as electric ink screens.

Furthermore, the LCD screen may be LCD module not having back lighting.

The inner screen is preferably a liquid crystal panel or an electric ink panel, or other panels with an array of controllable holes where light can pass or get blocked.

The outer screen can be monochrome or chromatic screen.

The shape of the inner and outer screens is preferable spherical, cylindrical, or planar, and may be other shapes such as ellipsoidal, paraboloid or hyperboloid.

Furthermore, a radius of the spherical inner screen is 15-40 millimeters and that of the spherical outer screen is 18-70 millimeters; a radius of the cylindrical inner screen is 15-40 millimeters and that of the cylindrical outer screens is 18-70 millimeters; a distance between the planar inner screen and the eyeball center is 15-40 millimeters.

Furthermore, an angle of the spherical inner and outer screens to the eyeball center is less than 180 degrees, both horizontally and vertically.

Furthermore, horizontal angles of the cylindrical inner and outer screens to the eyeball center are less than 180 degrees; vertical sizes of the cylindrical inner and outer screens are less than 200 millimeters.

Furthermore, the sizes of the planar inner and outer screens are less than 200 millimeters, both horizontally and vertically.

The above display device comprises two display panels for projecting images to the left and right eyes respectively.

Furthermore, the images formed by the two display panels are parallactic, thereby realizing 3D vision.

The invention further provides a display method for the aforesaid display device having double-screen structure, the method comprises the following steps: inputting image data including angles of the pixels of the image; displaying the image by traversing and generating all light beams for forming the image, according to the input image data.

In the display method described above, one or more light beams for forming the image can be generated at one time.

Furthermore, only one transparent hole is opened at one time when a plurality of light beams for the image are generated at one time.

Furthermore, all the needed light beams related to a certain transparent hole are generated at the same time when the transparent hole is opened.

Furthermore, a plurality of transparent holes are opened at one time when a plurality of light beams for the image are generated at one time.

Furthermore, all the transparent holes in the inner screen are divided into several groups so that all the transparent holes in the same group are irrelevant to each other; one group is opened at one time and all the groups are traversed to display the image.

In the above display method, the light beams are preferably narrow light beams.

In the above display methods, the image data further includes one or several of the following features: the brightness, color and grayscale of each pixel in the image.

One of the main differences between the present invention and the prior art display technologies is as follows: in the present invention, the display device writes images based on angular coordinates onto the human retina directly with controllable light beams instead of generating the images at certain positions in the space. The limited focusing range of human eyes is no longer an important factor in this display technology. In other words, to get a vision, human eyes do not need to actively focus and look at an image, but passively receive the image written by the display device, thereby forming a visual perception.

The present invention has the following advantages: it improves the view angle and telepresence vision compared to the prior art display technologies; it decreases the size of the display device while increases the view angle; it is a personal near-eye display technology with high portability and security, which may have many applications in personal electronic devices, mobile visual phone, individual combat system, etc.

BRIEF DESCRIPTION OF THE DRAWINGS

In the following, embodiments of the invention will be described in detail with reference to the drawings, in which.

DETAILED DESCRIPTIONS OF THE INVENTION

First, an optic model of human eyes will be described briefly.

It is not easy to calculate the imaging process of human eyes precisely due to that the eye is a complex optic system consisting of many refractive interfaces with different indices of refraction. Several simplified optic models are used for the practical calculation of the eye, among which a commonly used model is known as Gullstrand's simplified eye (by A. Gullstrand). A Gullstrand's simplified eye is a single spherical refractive system with a medium having a unique refractive index n of 1.33, a radius r of the refractive surface is 5.7 mm. The front and back focal lengths of the Gullstrand's simplified eye are $f_1=17.1$ mm, $f_2=1.33 \times f_1=22.8$ mm, respectively. The diopter D is $58.48(m^{-1})$. The difference in the front and back focal lengths is due to the difference in the indices of refraction of the object distance and the image distance. The imaging formula is $f_1/u+1.33 \times f_1/v=1$ or $1/u+1.33/v=D$, where u is the object distance and v is the image distance. The optic models of the eyes are widely used in education, medical systems and optical instrument design. The above simplified model of eyes may be slightly modified based on the commonly known ophthalmic data: considering the tuning ability of the eyes, the diopter D of normal human eyes varies between 58-68 $(m^{-1})$, so $f_1$ in the imaging formula is set as a variable between 14.71-17.24 mm. The resolution of normal human eyes is typically 0.1 mm at 250 mm, which is the distance of distinct vision. According to the imaging formula, $v \approx 24$ mm when u is 250 mm. Thus, the minimum spatial resolution on the retina is about $0.1/250 \times 24 \approx 0.01$ (mm)=$1 \times 10^{-5}$ m.

Figure 1:
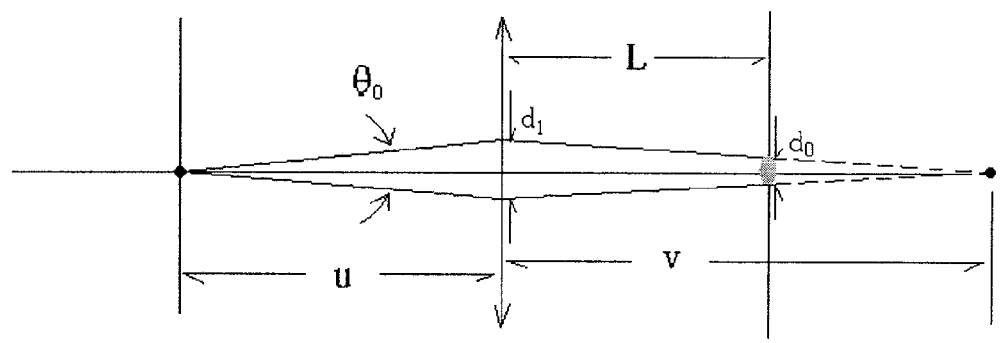
FIG. 1 is a schematic diagram illustrating the general principles of the present invention.

The basic optical principles of the present invention are shown in FIG. 1. According to the simplified eye model, a light spot locating at the object distance u emits a light beam with a divergent angle (cone-apex angle) $\theta_0$ towards the eye and illuminates a disk with a diameter of $d_1$ on the pupil. Here the diopter is D, the distance from the pupil to the retina is L ($L \approx 0.024$ m), and the illuminated disk on the retina has a diameter of $d_0$. In the present invention, the discussion is confined to narrow light beams, where $\theta_0$ is very small, for which there is an approximation expression $\theta_0 \approx tg\theta_0 = d_1/u$. According to the imaging formula, $d_0 = d_1 \times |1-(D-1/u) \times L/1.33|$, so when $L \approx 0.024$ m, the following formula is obtained:

$$d_0(D,u,\theta_0) \approx \theta_0 \times |1+(1-0.018 \times D) \times u| \qquad (1)$$

In formula (1), $\theta_0$, D and u are in rad, $m^{-1}$ and m, respectively. In the present invention, near-eye display is considered, so only the range of 0<u<1 m will be discussed. Since D varies in the range of 58-68 $(m^{-1})$, the absolute sign in formula (1) can be omitted. In the first case, when the values of $\theta_0$ and u render $d_0 \approx \theta_0 \times (1-0.044 \times u) \le 1 \times 10^{-5}$ m, the diameter $d_0$ of the disk illuminated by the light beam of FIG. 1 on the retina is always smaller than the minimum spatial resolution of human retina, despite the tuning of D in 58-68 $(m^{-1})$. Thus, no matter where the eye is focused at, one will have only the vision of a single and clear spot, which is already the minimal sensible spot on the retina. The second case is when the values of $\theta_0$ and u render $d_0(58,u,\theta_0)-d_0(68,u,\theta_0) \approx 0.18 \times \theta_0 \times u \le 1 \times 10^{-5}$ m. In this case, the amount of change in the diameter ($d_0$) of the disk illuminated by the light beam of FIG. 1 is always smaller than the minimum spatial resolution distance $1 \times 10^{-5}$ m of human retina, despite the tuning of D in 58-68 $(m^{-1})$. Thus, no matter where the eye is focused at, one will have only the vision of a single and clear spot as well, at this time, the illuminated disk is bigger than that in the first case, but the tuning of D will not cause a perceivable change of the vision on the retina. Notice that one feels a spot is "clear" to him if he can not make it clearer on the retina by tuning the D value of his eye. Due to the limited range of the diopter D and limited spatial resolution of the human retina, the spot illuminated by the beam of FIG. 1 on the retina does not seem visually bigger (vaguer) or smaller (clearer) in either of the cases above, wherever he/she actively focuses his/her eyes at. Therefore, in the present invention, instead of actively focusing and "looking at" the image according to the conventional method, human eyes just passively receive the image written onto the retina by using a beam satisfying either of the cases described above.

Those ordinarily skilled in the art will appreciate that the above theoretical model is constructed for explaining the principle of the invention only. In practical applications, as long as the diameter of the spot illuminated by a beam on the retina or the varying range of the spot diameter is in the same order as or smaller than the minimal spatial resolution of the retina, no matter at which direction the beam is generated, the spot will not become clearer or unclearer by tuning of the diopter of human eyes. In the invention, such a beam, which satisfies the condition that the diameter of the spot formed by the beam on the retina or the varying range of the spot diameter is in the same order as or smaller than the minimal spatial resolution of the retina, is referred to as a narrow light beam or a light beam for short. Imaging of the display device in the invention depends on many fine spots directly written onto the retina by a plurality of narrow beams instead of the active focusing of the human eyes. Each fine spot represents a pixel. The plurality of spots is densely arranged on the retina to form the image viewed by the eyes. The tuning ability of the lens is limited and can only change the size of the spots slightly. Meanwhile, the spatial resolution of the retina is also limited and such slight changes will not be sensed by the eyes. Thus, the image sensed by the retina is almost invariable, no matter where the eyes focus. In other words, the eyes only receive the image written to them passively, instead of actively "viewing" the image.

In the present invention, the light beams headed to the human eyes are classified into main light beams and auxiliary light beams, the term "main light beam" refers to light beams whose extension lines go through the center of the eyeball, while the term "auxiliary light beam" refers to light beams whose extension lines do not go through the center of the eyeball. Main light beams and auxiliary light beams play different roles in forming the image. It is known that the eyeball can rotate and the pupil can thus change its position on the surface of the eyeball. When the pupil moves to a certain position, the main light beams projected into the pupil illuminate an area near the macula on the retina, which correspond to the central vision of eyes, while the auxiliary light beams projected into the pupil illuminate an area far from the macula on the retina, which correspond to the peripheral vision of eyes.

There are several mechanisms of 3D vision, which are respectively listed below, with the dominating range decreasing one by one: the parallax (i.e. the slight image difference seen by the left and right eyes, dominating from a distance of infinite to about 10 meters), the convergence (i.e. the angle between two vision axes of the left and right eyes, dominating from a distance of about 10 meters to distinct vision of about 0.25 meters); and the single eye focusing (i.e. the diopter tuning of each eye, dominating from the distance of distinct vision of about 0.25 meters to the near point of human eye). The dominating ranges of different mechanisms are not distinguished strictly and may overlap. Normally, the 3D vision of the human eyes relies on both the parallax and the convergence. When watching something very close, as close as the reading distance or even closer, the focusing of a single eye is also involved.

3D vision is possible when scenery is viewed by both eyes. However, for normal object distance (>0.25 m), the focusing of one eye can hardly give the distance information, since the convergence and parallax by both eyes are not formed. Thus, a single eye can only see an image made of information from different angles, without any sense of distance. In view of the above, when forming an image to a single eye, only angle information of the image needs to be sensed by the eye, and no distance information is needed. Therefore, there is no need to include the distance information besides the angle, brightness, color, etc. of each of the pixels, when writing image pixels into one eye.

When a main light beam generated by the display device worn by one eye enters the pupil, a light spot will be formed on the retina. When the main light beams corresponding to respective pixels of a picture enter the pupil, the picture will be formed on the retina, the eye will "see" the picture. Moreover, the picture seen by the eye will become clearer with the decrease of the diameters of the light spots and the increase of the number of main light beams.

Figure 2:
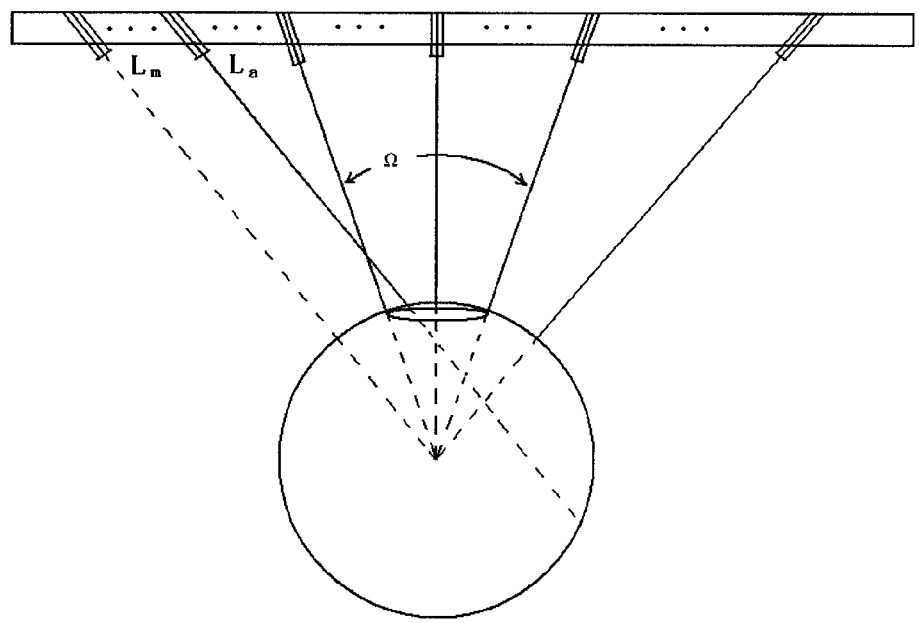
FIG. 2 is a schematic diagram illustrating how the auxiliary light beams are used in display.

As shown in FIG. 2, when the eye stares at a specific direction, due to the finite size of the pupil, if only the main light beams are used in imaging, the solid angle of the vision is Ω, which is approximately as small as the solid angle of the pupil to the eyeball center. So the auxiliary light beams have to be included to increase the sight angle. As shown in FIG. 2, the main light beam $L_m$, the extension line of which goes through the center of the eyeball, is in parallel with the auxiliary light beam $L_a$, the extension line of which does not go through the center of the eyeball. The main light beam $L_m$ and the auxiliary light beam $L_a$ represent the same pixel in the image to be displayed. Because of the confinement by the pupil, the main light beam $L_m$ can not reach the retina through the pupil, but the auxiliary light beam $L_a$ carrying the same pixel information can reach the retina through the pupil. This diagram shows how the auxiliary light beams are used to make the visual angle of the received image greater than the solid angle Ω when the eye stares at a specific direction, thereby increasing the sight angle.

When the display device of the invention is used to display an image, only image information needs to be input, which includes the brightness and angle of each of the pixels. Then, the main light beams and/or auxiliary light beams having the same information as brightness and angles of the pixels of the image are generated by the display device, thereby forming an image to the eyes.

The spherical coordinate system used throughout the embodiments of the invention is defined as follows. First, a 3D rectangular coordinate system is defined by setting the eyeball center as the origin, the upward axis, relative to the head, as the z axis, the forward axis as the y axis and the rightward axis as the x axis. Next, following the standard coordinate conversion rules, the described (x, y, z) rectangular coordinate system is converted into (θ, φ, r) spherical coordinate system. According to the display principles described above, the distance r (the radius of the spherical coordinate system) is usually not important in the imaging process, only the angular information of each of the pixels is required for image display. Thus, only angular information (θ, φ) will be used in the following description and discussion and the radius r will be omitted. It is obvious to one with ordinary skill in the related art that such coordinate system is intended to describe, instead of limiting, the invention, and it may be modified without departing from the substance of the present invention.

In the following, the display devices and display methods of the invention will be described in detail with reference to the embodiments and the accompanying figures.

Embodiment 1

Figure 4:
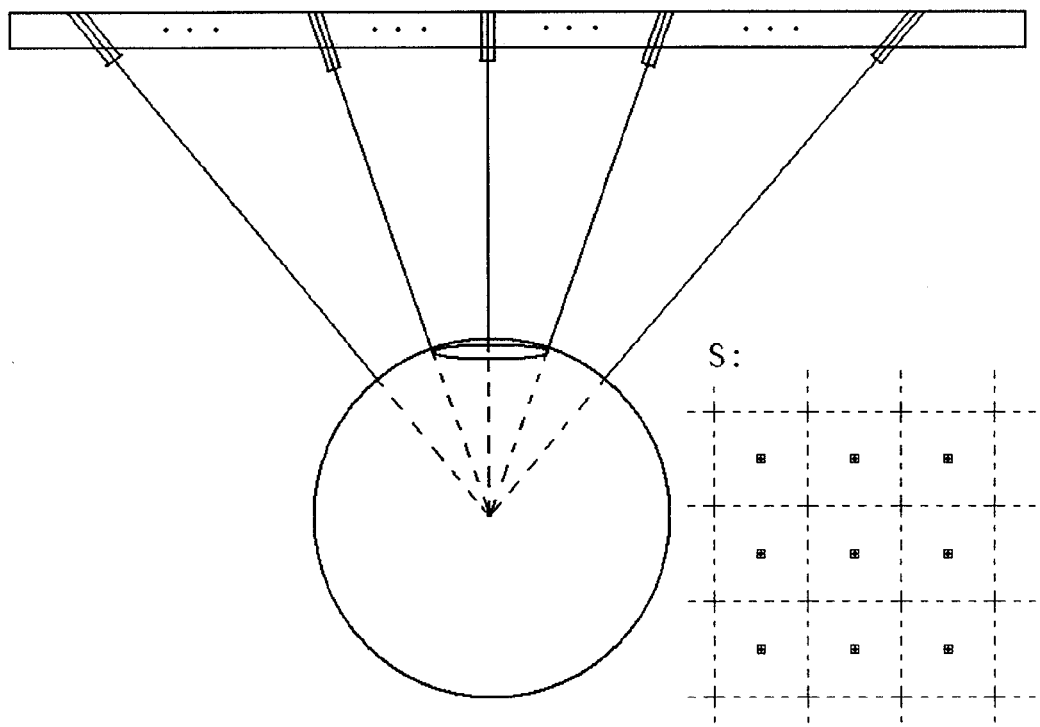
FIG. 4 is a schematic diagram illustrating the display method according to embodiment 1 of the invention.

The display device of this embodiment is shown in FIG. 4 and generally comprises a planar laser display panel S with an array of laser units, and a panel fixing device used to fix the panel with the laser array in front of the human eye. The array consists of 600*400 solid-state laser units, each of which functions as a luminescent pixel of the display panel. The cross section diameter of the laser beams emitted from the pixels is 5-75 μm, and 25 μm is used for the purpose of the embodiment. The wavelength of the laser beams is 0.39-0.77 μm, and 0.514 μm is used for the purpose of the embodiment. The size of the laser display panel is 60 mm*45 mm, and the distance from the eyeball center to the display panel is 30 mm. The solid laser units in the array are arranged uniformly on the laser display panel, and all the laser emitted by the laser units points at the eyeball center directly.

In this embodiment, the angles of all the laser units are fixed. In order to display an image to the eye, the information of the image including the angles of all pixels will be inputted first. Then the laser units with the same angles of the pixels are turned on and tuned according to the brightness of the related pixels, thereby forming a picture with respect to the eyes.

The image information may also include one or several of the following features of the pixels for image display: brightness, color, and grey scale.

It is obvious to one with ordinary skill in the related art that when the data of an image does not satisfy the above requirements, the data may be transformed into the data with angle information before it is sent to the display panel.

The display panel according to the embodiment is monochromatic. Based on this embodiment, chromatic display may be realized by simply replacing each monochrome laser unit with several laser units of different wavelengths, such as laser units in the RGB primary colors.

The above display panel is used for a single eye. Based on this embodiment, 3D display may be realized by deploying two display panels for both eyes and displaying parallax images to the eyes.

Generally, the sum of the areas of all the laser units is smaller than the total area of the display panel. So holes or transparent materials may be used in the unoccupied area of the display panel, so that some amount of light from the outside can come through the display panel. The advantage of this modification is that the eye is allowed to see the outside real world besides the images displayed by the panel. The image on the display panel may even be superpositioned on an image of the real world, which is very important to virtual reality technology.

In this embodiment, a planar display panel is used. Due to different needs, other shapes of the panel, such as spherical, cylindrical, ellipsoidal, paraboloid or hyperboloid surfaces are also applicable. The size of the planar display panel in both the horizontal and the vertical direction is generally less than 200 mm. For display panels with different size and resolution, the diameter of the cross section of the beam emitted by the semiconductor lasers may be 1 µm to 500 µm. The angle of the spherical display panel to the eyeball center is generally less than 180 degrees. The horizontal angle of the cylindrical display panel to the eyeball center is less than 180 degrees as well, and the vertical size of the cylindrical display panel is generally less than 200 mm. The distance from the eyeball center to the center of any shape of display panel may be 15-70 mm.

Embodiment 2

Figure 5:
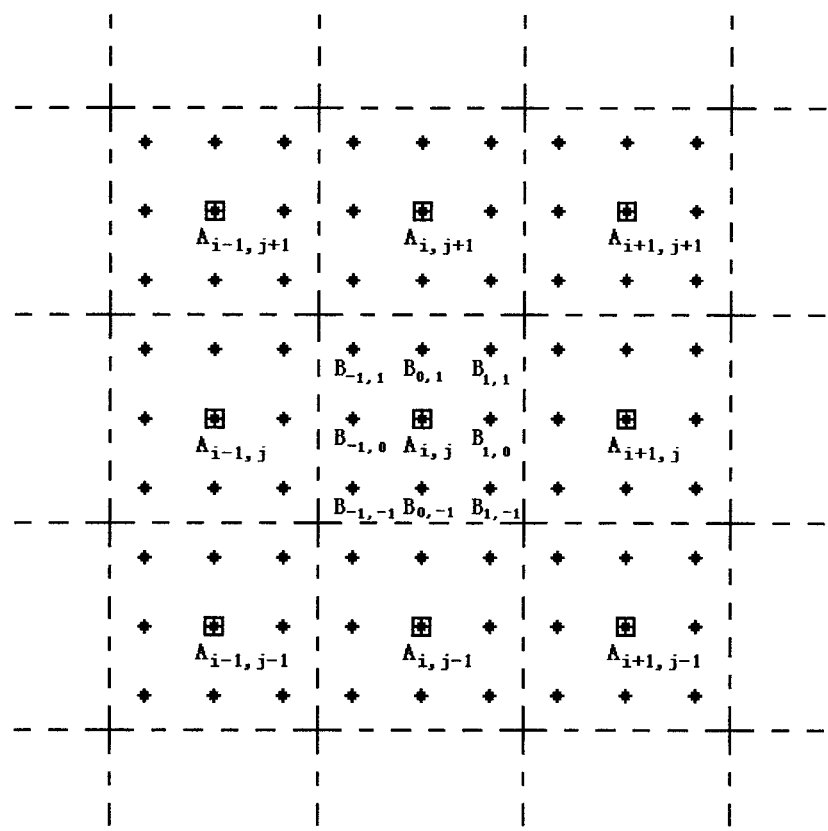
FIG. 5 is a structural diagram of the display screen in embodiment 2 of the invention.

This embodiment is different from embodiment 1 in that this embodiment has more laser beams. Besides the laser units emitting laser beams that go through the eyeball center, additional laser units emitting laser beams incident onto the eyeball surface but not going through the eyeball center are added. The specific configuration of the newly added laser units is shown in FIG. 5, in which eight new laser units $B_{1,0}$, $B_{1,1}$, $B_{0,1}$, $B_{-1,1}$, $B_{-1,0}$, $B_{-1,-1}$, $B_{0,-1}$, $B_{1,-1}$, or $B_{m,n}$ (m=1, 0, −1, n=1, 0, −1) are added around each original laser unit $A_{i,j}$ (i=1, 2, 3, . . . , 600, j=1, 2, 3, . . . , 400) described in embodiment 1, so that a 3 by 3 matrix is formed. In this embodiment, the angle of the original laser unit $A_{i,j}$; remains the same, the angle of the new unit $B_{m,n}$ is equal to that of the old unit $A_{(i+9m),(j+9n)}$. Based on the above teaching, one with ordinary skill in the related art may add additional laser units using various other suitable methods.

In this embodiment, the angles of all the laser units are also fixed, thus the display method of this embodiment is the same with that described in embodiment 1. In order to display an image to the eye, the information of the image including the angles of all pixels is inputted first. Then the laser units with the same angles of the pixels are turned on and tuned according to the brightness of the related pixels, thereby forming an image with respect to the eyes.

When the eye stares at a specific direction, due to the finite size of the pupil, if only the light beams going through the eyeball center are used in imaging, to the solid angle of the vision is Ω, which is approximately as small as the solid angle of the pupil to the eyeball center. In this embodiment, semiconductor laser unit $L_a$ is added, the laser beam emitted from semiconductor laser unit $L_a$ is incident onto the eyeball surface but does not go through the eyeball center. As shown in FIG. 2, the laser beam emitted from semiconductor laser unit $L_m$ that goes through the eyeball center is in parallel with the laser beam emitted by the first semiconductor laser unit $L_a$ that does not go through the eyeball center, and both laser beams represent the same pixel in the image to be displayed. Due to the confinement by the pupil, the laser beam emitted by the second semiconductor laser unit $L_m$ can not reach the retina, but the light beam emitted by the first semiconductor laser unit $L_a$ carrying the same pixel information can reach the retina. So in this embodiment, the sight angle is increased to an angle larger than Ω, thereby realizing a wider visual field.

Both embodiments 1 and 2 use an array of laser units in their display panels. The objective of using laser array is to generate light beams with well-defined directions and small enough cross section diameters. However, other than using laser units, a double-screen structure described in the following may also be used to generate such light beams as needed.

In the present invention, the double-screen structure comprises an inner screen and an outer screen, where the inner screen lies closer to the surface of the human eye. The outer screen is used to generate luminous spots in a controllable manner; the inner screen is used to generate the needed narrow light beams by confining the direction and cross section diameter (generally less than 0.5 mm) of the light from the luminous spots via transparent holes, also in a controllable manner. Two 2D arrays are formed on the inner and outer screens with the transparent holes and luminous spots, respectively. Each transparent hole or luminous spot can be uniquely indicated by index (i, j), thus each light beam towards the eye generated from the outer screen luminous spot $(i_2, j_2)$ through the inner screen transparent hole $(i_1, j_1)$ can be uniquely indicated by index $(i_1, j_1; i_2, j_2)$.

Double-screen based design is adopted in the following embodiments. When there are the same number of transparent holes and luminous spots and there is a one-to-one mapping between them, a pair of transparent holes on the inner screen and luminous spot on the outer screen has the same indices. According to the present design, all the light beams (i, j; i, j) are set to be a main light beam, which means the extensions of the lines from the inner screen to the eyeball surface go through the eyeball center. The coordinates $(\theta_i, \phi_j)$ of those main light beam angles between the eyeball and the inner screen are uniformly dispersed with the interval $(\Delta\theta, \Delta\phi) = (\theta_{i+1} - \theta_i, \phi_{j+1} - \phi_j)$. After the above definition of the main light beams, the intersection points of the main light beams and the inner screen surface are used as the positions of the transparent holes; then the meeting points of the main light beams and the outer screen can be calculated from the refraction index n between the two screens, which are used as the positions of the luminous spots. The calculation described above is straightforward to one with ordinary skill in the related art.

Embodiment 3

Figure 6:
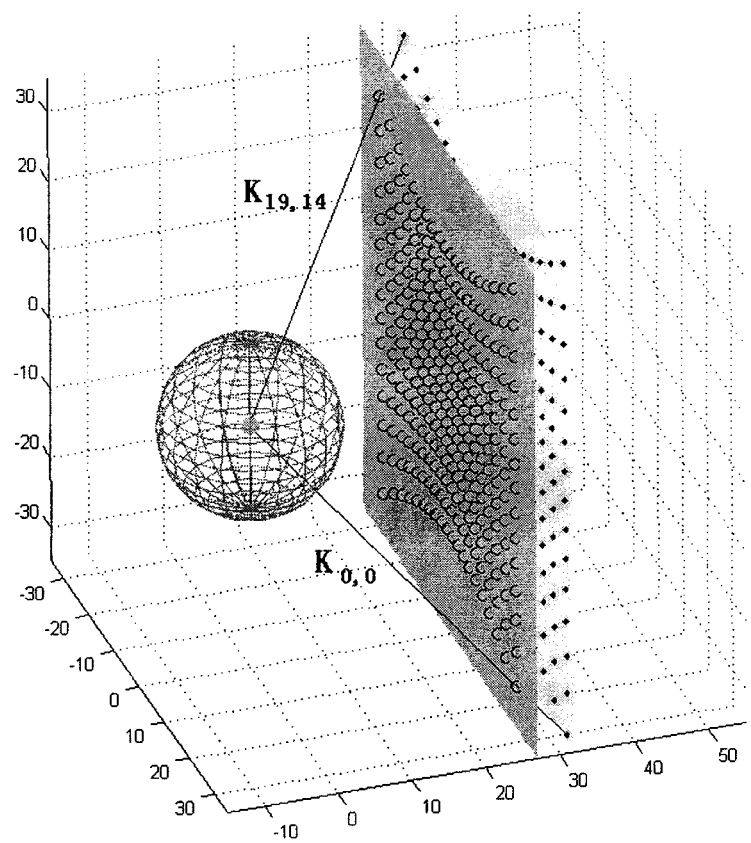
FIG. 6 is a schematic diagram illustrating the double-screen structure in embodiment 3 of the invention.

As shown in FIG. 6, the display device according to this embodiment comprises an inner screen and an outer screen. The inner screen is a 60 mm×45 mm planar panel with 20*15 transparent holes having a diameter of 20 µm. The outer screen is a 70 mm×70 mm planar OLED screen with 20×15 luminous spots having a diameter of 20 µm. The distance between the inner screen and the outer screen is 5 mm. The inner screen locates in front of eyes and is 27 mm away from the eyeball center, and the distances from the four corners of the inner screen to the eyeball center are equal. Likewise, the outer screen locates in front of the eyes and is 32 mm away from the eyeball center, and the distances from the four corners of the outer screen to the eyeball center are equal. There is a one-to-one mapping between the transparent holes and the luminous spots, and the locations of the holes and spots are shown in FIG. 6. In the spherical coordinates having the eyeball center as the origin, a bunch of 20×15 rays indicated by $K_{p,q}(45°+(90°/19)p, -37°+(74°/14)q)$ (p=0, 1, 2, . . . , 19; q=0, 1, 2, . . . , 14) cross the inner and outer screens at 20×15 intersection points, and the intersection points are located at where the transparent holes in the inner screen and the luminous spots in the outer screen are, respectively. Such a sparse distribution of the transparent holes and the luminous spots guarantees that, among all the narrow light beams from a luminous spot, only the narrow light beam through its relative transparent hole (according to the one-to-one mapping) heads to the eyeball center, while the light beams through other transparent holes can not reach the eye surface.

In this embodiment, the angles of all the narrow light beams heading to the eyeball center are fixed. In order to display an image to the eye, the information of the image including the angles and brightness of all pixels is inputted first. Then the brightness of each luminous spot in the outer screen is tuned according to the image pixel with the same angle as the narrow light beam heading to the eyeball center generated by this luminous spot, thereby forming a picture with respect to the eyes.

In this embodiment, the outer screen is preferably a LED panel, a LD panel, or a LCD panel; other panels suitable for acting as a display panel, such as an electric ink panel (Journal of Functional Materials, No. 10 (Vol. 36) 2005, p 1477 to 1481, Fu Xiangkai, Luo Wei), may also be used as the outer screen. All these screens may be monochrome or chromatic. The LCD panel used by the outer screen may be an active LCD with backlight or a passive LCD without backlight. The daylight or ambient light can be used as backlight for the passive LCD and the display effect will be comparable. Passive light-emitting means the pixel itself does not emit any light; instead, the pixel is displayed depending on the ambient light.

In this embodiment, other display panels such as LCD panel and electric ink panel, on which transparent holes allowing the beam to be passed or blocked may be formed, are also applied as the inner screen. Among all the options, the LCD panel is preferable.

The diameters of the transparent holes in the inner screen are generally less than 500 µm, and preferably between 1 µm and 100 µm. The diameters of the luminous spots in the outer screen are generally less than 500 µm, and preferably between 1 µm and 100 µm. The distance from the eyeball surface to the inner screen is 0.1 mm-50 mm. The distance from the eyeball surface to the outer screen is 0.1 mm-50 mm. The shapes of the inner and outer screens may be spherical surface, cylindrical surface or planar surface, and other shapes such as ellipsoidal surface, paraboloid surface or hyperboloid surface are also allowed. The radii of the spherical inner and outer screens are 15-40 mm and 18-70 mm, respectively. The horizontal and vertical angles of the spherical inner and outer screens to the eyeball center are generally less than 180 degree. The radii of the cylindrical inner and outer screens may be 15-40 mm and 18-70 mm, respectively. The horizontal and vertical angles of the cylindrical inner and outer screens to the eyeball center are generally less than 180 degree. The length of cylindrical panels is less than 200 mm in the vertical direction. The horizontal and vertical sizes of the planar display panel are generally less than 200 mm, and the distance between the planar inner screen and the eyeball center is 15 mm to 40 mm.

In this embodiment, any transparent medium, preferably with a refractive index of 1.0 to 2.5, may be disposed between the inner and outer screens. The transparent medium is preferably selected from transparent resin, optic glass, etc. When the transparent medium is disposed between the inner and outer panel, the positions of the luminous spots in the outer screen have to be adjusted according to the refractive index, such that the light beam emitted by the luminous pixels in the outer screen is still directed to the eyeball center after the refraction from the transparent medium and going through the transparent holes in the inner panel. The adjustment is known to one with ordinary skill in the related art.

In this embodiment, light from the outside world is allowed to come through the area not having the luminous pixels. For example, the outer screen may be made of transparent materials. Or else, when the material of the outer screen is not transparent, a plurality of transparent holes may be made on the outer screen such that light from the outside world can come through the display device.

In this embodiment, the aforesaid double-screen display device is used to display images to one eye. 3D display will be realized by deploying two double-screen display devices for both eyes and displaying parallax images to them.

Embodiment 4

The resolution of the display device is only 20×15 in embodiment 3 and only the main light beams are used. In order to display images with higher definition and widen the view angle, the resolution of the display device should be increased and the auxiliary light beams be fully used. To this end, the number and density of the transparent holes in the inner screen and the luminous spots in the outer screen are increased. Consequently, more main light beams are generated, and auxiliary light beams are used in displaying images.

Figure 7:
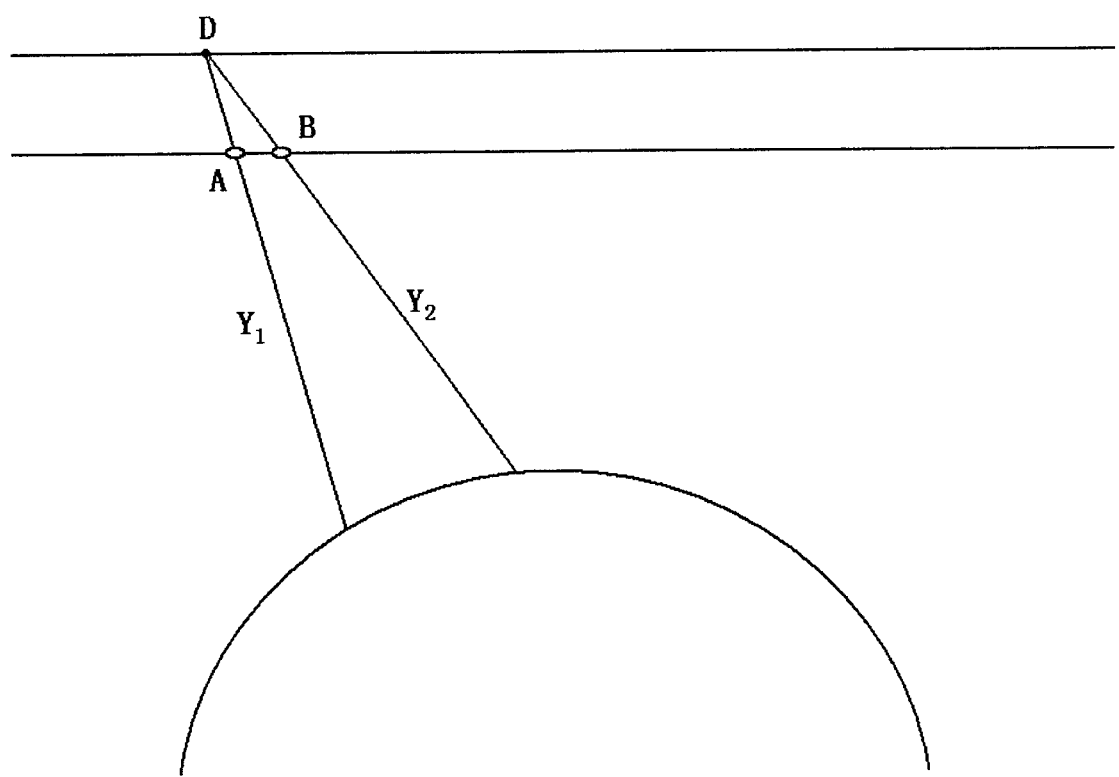
FIG. 7 is a schematic diagram illustrating the high resolution double-screen image display principles according to embodiment 4 of the invention.

When the number and density of the transparent holes in the inner screen and the luminous spots in the outer screen are increased, the display method will be more complex. As shown in FIG. 7, Y1 is a narrow light beam generated for displaying the image. Because the transparent holes A and B are close to each other, when the light from luminous spot D in the outer screen goes through the transparent hole A and becomes the narrow light beam Y1, another narrow light beam Y2 is generated by the same light from D through a different transparent hole B and carries the same information (brightness, color, etc.) as Y1. However, the narrow light beam Y2 has an angle of ($\theta2$, $\phi2$). When displaying the image, the pixel with the angle of ($\theta2$, $\phi2$) may not necessarily be the same as the pixel represented by Y1 with the angle of ($\theta1$, $\phi1$). Thus, the generation of Y2 should be avoided and the structure according to embodiment 3 is no longer applicable. Therefore, the transparent holes in the inner screen should be opened and closed under control. In the case shown in FIG. 7, B is blocked to eliminate Y2 at a certain time when only Y1 is wanted.

Following the above principles, a display device is presented in this embodiment. The OLED outer screen has an array of 800×600 luminous spots, the LCD inner screen has an array of 800×600 liquid crystal pixels as the controllable transparent holes. The diameters of the luminous spots and the transparent holes are both 20☐µm. Other parameters and structures of the display device are the same as those described in embodiment 3.

Figure 8:
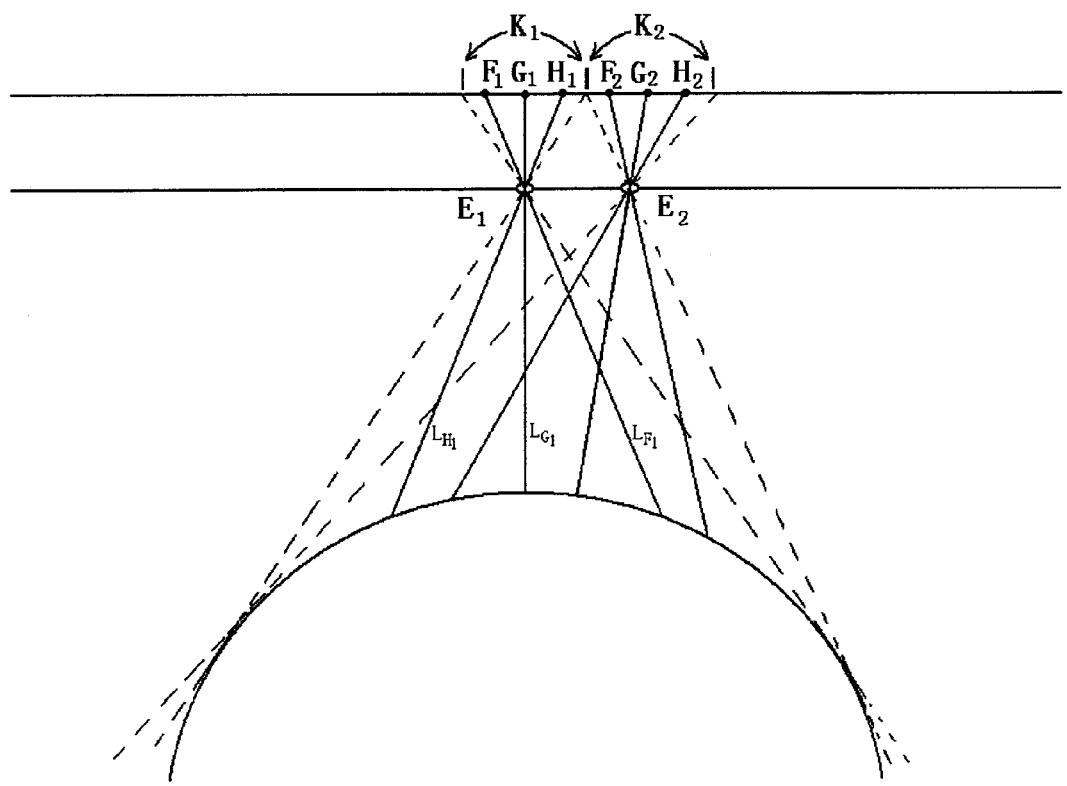
FIG. 8 is a schematic diagram illustrating two additional display methods of the display device according to embodiment 4 of the invention.

Two concepts are introduced here, the "relative hole" and the "relative region", which are used in describing the display methods. The relative region on the outer screen of a transparent hole is defined as follows: only the narrow light beams from the luminous spots in this relative region can reach the eyeball surface through the transparent hole. As shown in FIG. 8, K1 and K2 are the relative regions of transparent holes E1 and E2, respectively. When K1 and K2 include common luminous spots, E1 and E2 are referred to as relative holes.

In this embodiment, in order to display an image to the eye, the information of the image including the angles of all pixels will be inputted first. Then traversing and generating every narrow light beam needed for displaying the image according to the image data. Besides the angles of all pixels, the information of the image may also include the brightness, color and greyscale of the pixels.

In the display method described above, as for traversing and generating the needed narrow light beams, there are two choices: (1) only one narrow light beam is generated at one time; and (2) several narrow light beams are generated at one time. When several narrow light beams are generated at one time, only one transparent hole is opened at one time; or alternatively, several transparent holes are opened at one time.

In the case that only one transparent hole is opened at one time, several narrow light beams passing through this transparent hole for displaying the image can be generated at the same time, and preferably all the needed narrow light beams passing through this transparent hole are generated at the same time.

In the case that several transparent holes are opened at one time, preferably, all the transparent holes in the inner screen are divided into several groups, any two transparent holes in the same group are not relative holes. The transparent holes in the same group are opened at one time, and then all the groups are traversed and opened to thereby display the image.

Figure 9:
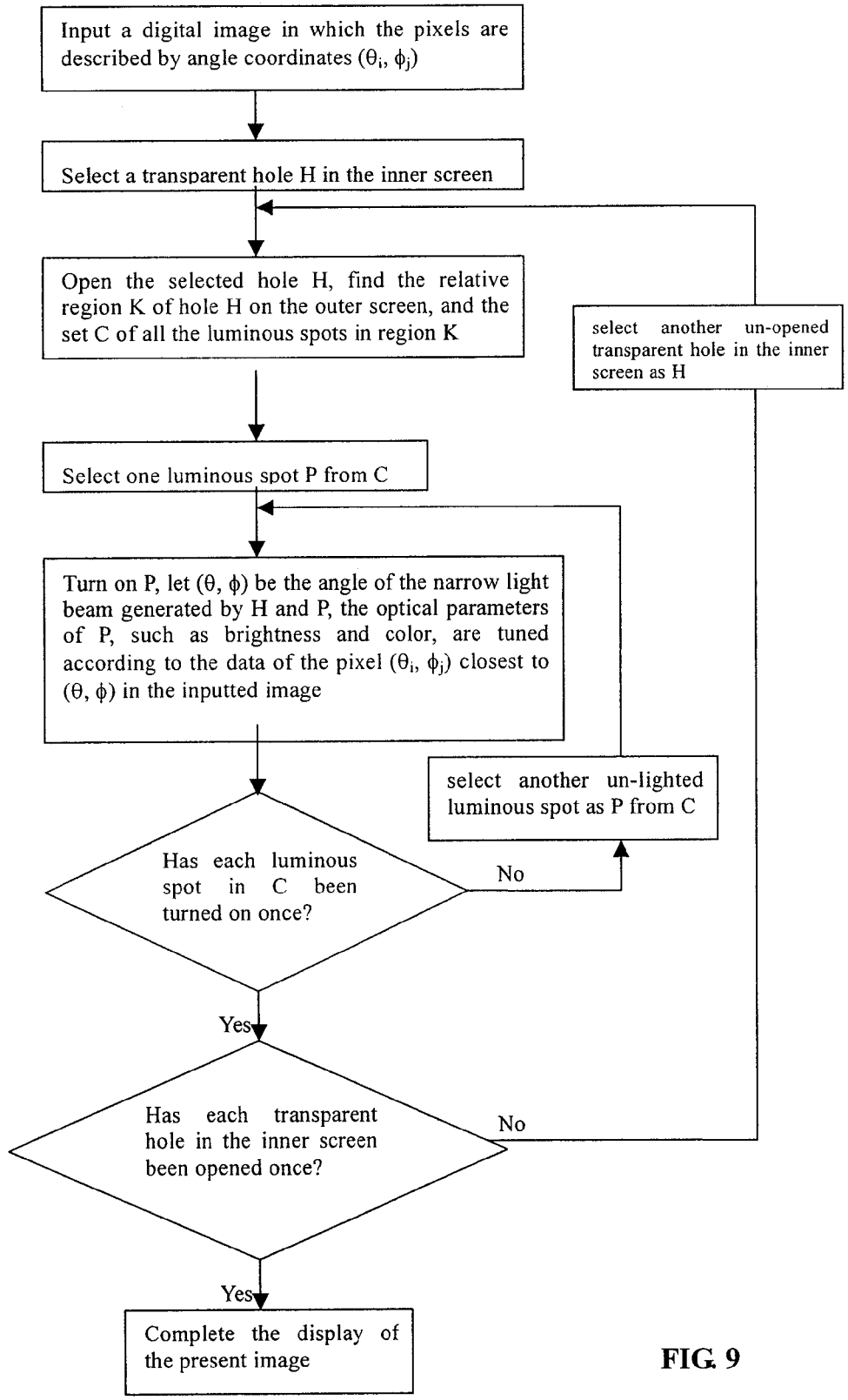
FIGS. 9-11 are flow charts of three display methods in embodiment 4 of the invention.

In order to explain the details of the display method in this embodiment, three display methods will be explained step-by-step in the following:

Method 1—based on the information of the image, only one narrow light beam is generated at one time. When all the narrow light beams for displaying the image are generated, a complete image may be viewed due to the residual vision. The flow chart of the method is shown in FIG. 9, said method includes the steps of:

(1) first inputting a digital image in which the pixels are described by angle coordinates $(\theta_i, \phi_j)$ as the image to be displayed;

(2) selecting a transparent hole H in the inner screen;

(3) opening the selected hole H, finding the relative region K of hole H on the outer screen, and the set C of all the luminous spots in the region K;

(4) selecting one pixel/luminous spot P from C;

(5) turning on the selected pixel P, assuming that $(\theta, \phi)$ is the angle of the narrow light beam generated by H and P, the optical parameters of P, such as brightness and color, are tuned according to the data of the pixel $(\theta_i, \phi_j)$ closest to $(\theta, \phi)$ in the inputted image;

(6) determining whether each of the luminous spots in C has been turned on once; if not, selecting another un-lighted luminous spot from C as the new pixel P, go to (5); if true, go to (7); and (7) determining if each transparent hole in the inner screen has been opened once; if not, selecting another un-opened transparent hole as the new transparent hole H, repeating steps (3) to (6); if true, the display of the present image is finished.

Figure 10:
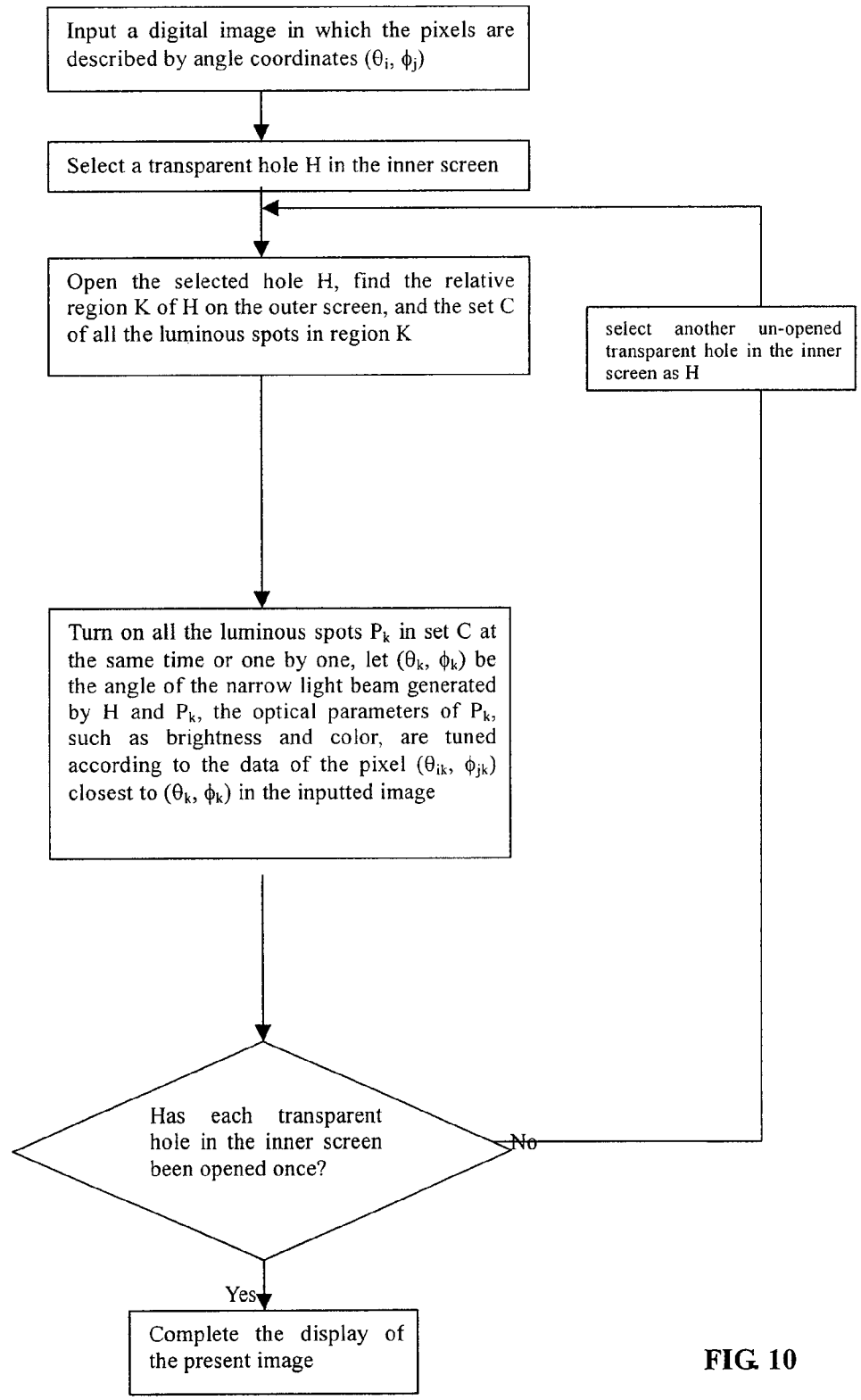

Method 2—According to the method, only one transparent hole is opened at one time. As shown in FIG. 8, when the display device is used to display an image, several narrow light beams such as $L_{F1}$, $L_{G1}$, $L_{H1}$ are generated at the same time when a single transparent hole E1 is opened. $L_{F1}$, $L_{G1}$, $L_{H1}$ are generated by the transparent hole E1 in combination with the luminous spots F1, G1, H1, which all locate in a relative region K1 on the outer screen and represent different pixels of the image. Thus, when a transparent hole is opened, all the narrow light beams necessary for displaying the image are simultaneously generated by the pixels in the relative region of the transparent hole on the outer screen while going through the transparent hole. In order to display an image, all the transparent holes in the inner screen should be opened one by one. The flow chart of the method is shown in FIG. 10 and comprises the steps of:

(1) inputting a digital image in which the pixels are described by angle coordinates $(\theta_i, \phi_j)$ as the image to be displayed;

(2) selecting a transparent hole H in the inner screen;

(3) opening the selected hole H, finding the relative region K of H on the outer screen, and the set C of all the luminous spots in the region K;

(4) turning on all the luminous spots $P_k$ in set C at the same time or one by one; assuming that $(\theta_k, \phi_k)$ is the angle of the narrow light beam generated by H and $P_k$, the optical parameters of $P_k$, such as brightness and color, are tuned according to the data of the pixel $(\theta_{ik}, \phi_{jk})$ closest to $(\theta_k, \phi_k)$ in the inputted image; and (5) determining if each transparent hole in the inner screen has been opened once; if not, selecting another un-opened transparent hole as H, go to steps (3) and (4); if true, the display of the present image is finished.

Figure 11:
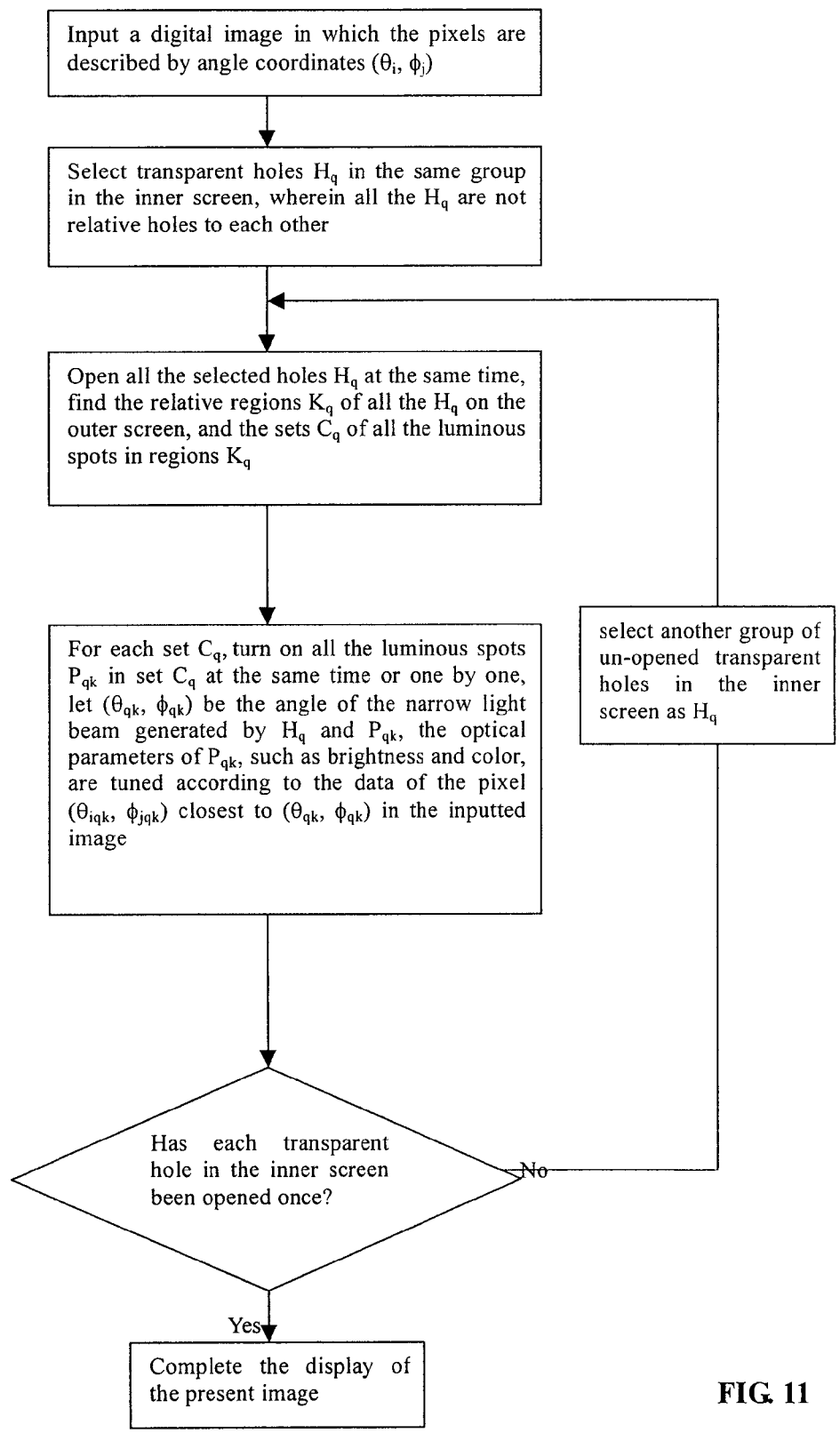

Method 3—Still referring to FIG. 8, to increase the speed and efficiency of the display device, as many transparent holes as possible should be opened at the same time. However, unwanted light beams may be generated if relative transparent holes are opened simultaneously, as shown in FIG. 7. Thus, only the irrelative transparent holes may be opened at the same time. A suitable way is to divide all the transparent holes in the inner screen into several groups, wherein any two transparent holes in the same group are not relative holes. When the image is displayed, the transparent holes in the same group are opened at one time, and the narrow light beams necessary for displaying the image are generated by the pixels in the relative region on the outer screen. When all the groups are traversed, the display of an image is realized. The flow chart of the method is shown in FIG. 11 and comprises the steps of:

(1) inputting a digital image in which the pixels are described by angle coordinates $(\theta_i, \phi_j)$ as the image to be displayed;

(2) selecting transparent holes $H_q$ in the same group in the inner screen, wherein all the $H_q$ are not relative holes to each other;

(3) opening all the selected transparent holes $H_q$ at the same time, finding the relative regions $K_q$ of all the $H_q$ on the outer screen, and the sets $C_q$ of all the luminous spots in regions $K_q$;

(4) for each set $C_q$, turning on all the luminous spots $P_{qk}$ in set $C_q$ at the same time or one by one; assuming that $(\theta_{qk}, \phi_{qk})$ is the angle of the narrow light beam generated by $H_q$ and $P_{qk}$, the optical parameters of $P_{qk}$, such as brightness and color, are tuned according to the data of the pixel $(\theta_{iqk}, \phi_{jqk})$ closest to $(\theta_{qk}, \phi_{qk})$ in the inputted image; and (5) determining if each transparent hole in the inner screen has been opened once; if not, selecting another group of a plurality of un-opened transparent holes as $H_q$, go to steps (3) and (4); if true, the display of the present image is finished.

It should be appreciated that the angular coordinates for the input digital image, which is represented by the angles in the spherical coordinates in the above embodiments, are discrete. However, with the double-screen structure of embodiments 3 and 4, it is difficult to make all the discrete angles of the image pixels fit exactly with the angles of the light beams generated by the luminous spots and transparent holes. For example, if the angle coordinates of two adjacent pixels P1 and P2 are (10°, 20°) and (11°, 20°), respectively, while the closest narrow light beam has an angle of (10.2°, 20°), then this light beam may be used to represent the pixel P1 based on the design requirement. This light beam may also be neglected. Image transform may also be used to convert the image data into the acceptable format of specific display devices, for example, via a computational method using the difference. These techniques are obvious to one with ordinary skill in the related art and will not be elaborated here.

Though the display devices described in embodiments 1 to 4 are used for a single eye, it is obvious to one with ordinary skill in the related art that 3D display can be realized by setting two display devices described in embodiments 1-4 in front of each eye and displaying parallax images to them.

Figure 3:
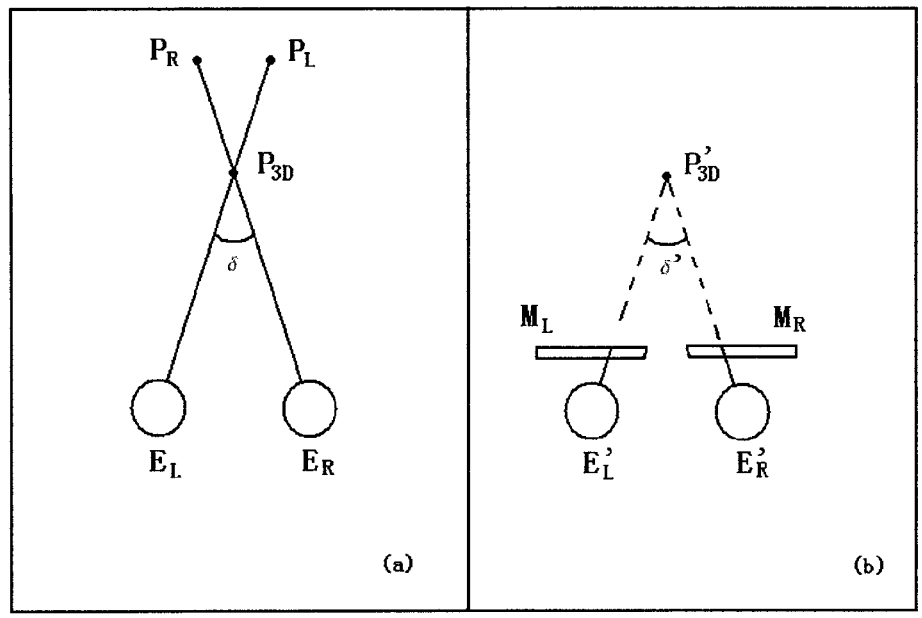
FIG. 3a is a schematic diagram illustrating the convergence angle in the traditional parallax 3D display method.
FIG. 3b is a schematic diagram illustrating the convergence angle of 3D vision according to the display device of the invention.

In the conventional 3D technologies, the artificial vision can not give the same effect as the natural real vision to the human eyes, which causes visual fatigue. One of the main problems is the mismatch between the convergence and focusing of the eyes. As shown in FIG. 3(a), $P_L$ and $P_R$ are the displayed parallax points to the left eye $E_L$ and the right eye $E_R$, representing the 3D point $P_{3D}$ in a 3D image. The convergence angle δ between line $E_L P_L$ and line $E_R P_R$ is the convergence, which tells the eyes to focus at distance $P_{3D}$. However, in order to see the points $P_L$ and $P_R$ clearly, eyes should focus at a further distance where $P_L$ and $P_R$ locate. It is such a conflict that causes unnatural feeling and visual fatigue.

According to the present invention, the use of narrow light beam and near-eye display guarantee that the eyes act as a passive image receiver. The adjustment of the diopter of the eyes within the possible range has a neglectable influence on the image quality. As shown in FIG. 3(b), a 3D point $P_{3D}'$ is produced via the intersection of two light beams from the left and right near-eye display panels $M_L$ and $M_R$, where the convergence angle δ' is the angle between these two light beams. The convergence angle δ' tells the eyes to focus at distance $P_{3D}'$, where the image received by the eyes at such diopter is also clear, as described before. As a result, the convergence angle does not conflict with the focusing, so the artificial 3D vision produced by the present invention feels just like natural real 3D vision without visual fatigue. This is another beneficial effect of the present invention.

The display devices and display methods described in the present invention are powerful 3D display technologies. Comparing with conventional 3D display technologies, the present invention eliminates the visual fatigue caused by the confliction between the convergence angle and the focusing in principle. Moreover, the present invention increases the visual angle and device portability, enhances telepresence vision, and combines artificial vision with real vision, which is the basis for many virtual reality applications. The present invention may be used in the fields of visualized engineering design, academic research, education, entertainment, art, medical diagnosis, robot operation, monitoring, rescuing work and the like.

The above describes mainly the structure of the display devices. For a practical display device, it is appreciated by one with ordinary skill in the related art that various functional modules may be added according to the functional and design requirements. For example, an image conversion module for converting the input image into the image format required by the display device of the invention, an audio module for inputting/outputting voices, a control module for controlling and coordinating the operation of each module in the display device, wired/wireless communication module for exchanging audio/visual data with other devices, a power module for supplying power to the display device, a movement sensor module for sensing the movement of the head and/or limbs, and input/output modules can be included according to specific applications.

The display device of the invention may be used as the display of various data terminals, such as television, handset and computers. It may also be made into a head-mounted device and used in portable personal electronic products, visualized mobile communication, individual combat, visualized engineering design, academic research, education, entertainment, art, medical diagnosis, robot operation, monitoring, rescuing work and the like.

In the above, the technical solutions of the invention are described in detail with reference to the embodiments. It should be appreciated by those skilled in the art that the embodiments are not intended to limit the scope of the invention, which is solely defined by the appended claims.

The invention claimed is:

1. A display device comprising:
    a display screen, wherein the display screen comprises an inner screen and an outer screen, and
    both the inner screen and the outer screen locate in front of human eyes, and the inner screen lies closer to the human eyes;
    an array of transparent holes is provided in the inner screen;
    an array of luminous spots is provided in the outer screen;
    the array of luminous spots emits light according to an image to be displayed; and
    the transparent holes in the inner screen have a mapping relation with the luminous spots in the outer screen, light emitted from the luminous spots becomes light beams heading to the eyeball after traveling through the corresponding transparent holes, wherein the diameter of the spot formed by each light beam on the retina, or the varying range of the spot diameter is in the same order as or smaller than the minimal spatial resolution of the retina.

2. The display device as set forth in claim 1, wherein the transparent holes in the inner screen are opened and blocked according to the image to be displayed.

3. The display device as set forth in claim 1, wherein the luminous spots emit light in a passive way.

4. The display device as set forth in claim 1, wherein the mapping relation between the luminous spots in the outer screen and the transparent holes in the inner screen is a one-to-one mapping.

5. The display device as set forth in claim 1, wherein the diameter of each transparent hole is 1-500 micrometers.

6. The display device as set forth in claim 1, wherein the diameter of each luminous spot in the outer screen is 1-500 micrometers, and the diameter of each transparent hole in the inner screen is 1-500 micrometers.

7. The display device as set forth in claim 1, wherein the distance between the inner screen and eyeball surface is 0.1-50 millimeters, the distance between the outer screen and the inner screen is 0.1-50 millimeters.

8. A display method for the display device having double-screen structure of claim 1, comprising:
    inputting image data, wherein the information about angles of the pixels of the image is included;
    displaying the image by traversing and generating all the light beams for forming the image, according to the input image data.

9. The display method as set forth in claim 8, wherein only one of the light beams for forming the image is generated at one time.

10. The display method as set forth in claim 8, wherein several of the light beams for forming the image are generated at one time.

11. The display method as set forth in claim 10, wherein only one of the transparent holes is opened at one time.

12. The display method as set forth in claim 11, wherein all the light beams related to a transparent hole and needed for forming the image are generated at the same time when the transparent hole is opened.

13. The display method as set forth in claim 10, wherein a plurality of the transparent holes are opened at one time.

14. The display method as set forth in claim 13, wherein all the transparent holes in the inner screen are divided into several groups such that all the transparent holes in the same group are irrelevant to each other; only one group is opened at one time; and all the groups are traversed to display the input image.

15. A head-mounted display device comprising two display units set forth in claim 1, said display units being located in front of left and right eyes respectively.

16. A display method for the head-mounted display device as set forth in claim 15, wherein the two display units generate images into the left and right eyes respectively.

17. The display method as set forth in claim 16, wherein parallactic images are displayed to the left and right eyes in order to realize a three dimensional vision.

* * * * *